(12) United States Patent
Cornwall et al.

(10) Patent No.: US 8,531,311 B2
(45) Date of Patent: Sep. 10, 2013

(54) TIME-DIVIDED COMMUNICATIONS IN A METERING SYSTEM

(75) Inventors: Mark Cornwall, Spokane, WA (US); Matthew Johnson, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 986 days.

(21) Appl. No.: 12/362,443

(22) Filed: Jan. 29, 2009

(65) Prior Publication Data

US 2010/0188258 A1    Jul. 29, 2010

(51) Int. Cl.
G08B 23/00    (2006.01)
G08C 15/06    (2006.01)

(52) U.S. Cl.
USPC .................................... 340/870.02

(58) Field of Classification Search
USPC ............. 340/870.02, 870.12, 870.13
See application file for complete search history.

(56) References Cited

U.S. PATENT DOCUMENTS

| | | | |
|---|---|---|---|
| 5,668,803 A * | 9/1997 | Tymes et al. | 370/312 |
| 5,883,886 A | 3/1999 | Eaton et al. | |
| 6,088,659 A | 7/2000 | Kelley et al. | |
| 2007/0057812 A1 * | 3/2007 | Cornwall | 340/870.02 |

OTHER PUBLICATIONS

Written Opinion of the International Searching Authority for PCT International Application No. PCT/US2009/068049 dated Feb. 8, 2010.
International Search Report for PCT International Application No. PCT/US2009/068049 mailed Feb. 24, 2010.

* cited by examiner

*Primary Examiner* — Rexford Barnie
*Assistant Examiner* — Christopher Clark
(74) *Attorney, Agent, or Firm* — Hanley, Flight & Zimmerman, LLC (57) ABSTRACT

A method, system, and related apparatus for performing time-divided communications in a metering environment are disclosed. In one embodiment, an endpoint (e.g., ERT) is provided that implements a method for communicating messages with a remote device. Generally, the method includes causing the endpoint to transmit a standard meter reading message within a predefined frequency band. Then, after waiting a predetermined amount of time, a receiver on the endpoint is activated to listen for a message transmitted by the remote device. While the receiver on the endpoint is activated, the endpoint may receive a command from the remote device without being required to transmit an additional standard meter reading message.

20 Claims, 6 Drawing Sheets

TIME-DIVIDED COMMUNICATIONS IN A METERING SYSTEM

BACKGROUND

Historically, the meter readings that measure consumption of utility resources, such as water, gas, or electricity, have been accomplished manually by human meter readers at the customers' premises. The relatively recent advances in this area include collection of data by telephone lines, radio transmission, walk-by, or drive-by reading systems using radio communications between the meters and the meter reading devices. Although some of these methods require close physical proximity to the meters, they have become more desirable than the manual reading and recording of the consumption levels. Over the last few years, there has been a concerted effort to automate meter reading by installing fixed networks that allow data to flow from the meter to a host computer system without human intervention. These systems are referred to in the art as Automated Meter Reading (AMR) systems.

In an AMR system, an Encoder Receiver Transmitter ("ERT") may be implemented within a utility meter in order to encode and transmit data utilizing radio-based communications. The ERT is a meter interface device attached to the meter, which either periodically transmits utility consumption data ("bubble-up" ERTs) or receives a "wake up" polling signal containing a request for their meter information from a collector (e.g., a fixed transceiver unit, a transceiver mounted in a passing vehicle, a handheld unit, etc.).

The ERTs typically communicate with a collector via wireless spread-spectrum modulation protocols, such as direct-sequence spread-spectrum (DSSS) and frequency-hopping spread-spectrum (FHSS). DSSS combines a data signal at the ERT with a higher data-rate bit sequence, sometimes called a "chipping code" or "processing gain." A high processing gain increases the signal's resistance to interference. FHSS, on the other hand, operates by taking the data signal and modulating it with a carrier signal that hops from frequency to frequency as a function of time over a wide band of frequencies. With FHSS, the carrier frequency changes periodically, and therefore, potentially reduces interference since an interfering signal from a narrowband system will only affect the spread-spectrum signal if both are transmitting at the same frequency and at the same time.

In existing AMR systems, ERTs may be configured to accept and respond to commands. The enhanced services desired by customers and utility service providers will only continue to increase the need for performing these types of two-way communications. However, to minimize the consumption of power, ERTs are typically configured to only activate a receiver and listen for incoming messages when necessary. Accordingly, a remote device may not be able to transmit a message to the ERT while the receiver is deactivated. In this regard, existing automated meter reading protocols and related systems are limited in their ability to facilitate timely two-way communications with ERTs. In some instances, collectors used to collect meter readings are required to wait one or more intervals to issue a command or otherwise perform two-way communications with an ERT.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method, system, and related apparatus for performing time-divided communications in a metering environment are disclosed. In one embodiment, an endpoint (e.g., ERT) is provided that implements a method for communicating time-divided messages with a remote device. Generally, the method includes causing the endpoint to transmit a standard meter reading message within a predefined frequency band. Then, after waiting a predetermined amount of time, a receiver on the endpoint is activated to listen for a message transmitted by the remote device. While the receiver on the endpoint is activated, the endpoint may receive a command from the remote device without being required to transmit an additional standard meter reading message.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following description first provides a general description of a meter reading system in which the disclosed subject matter may be implemented. Then, exemplary routines for implementing linked communications in the metering system will be described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Figure 1:
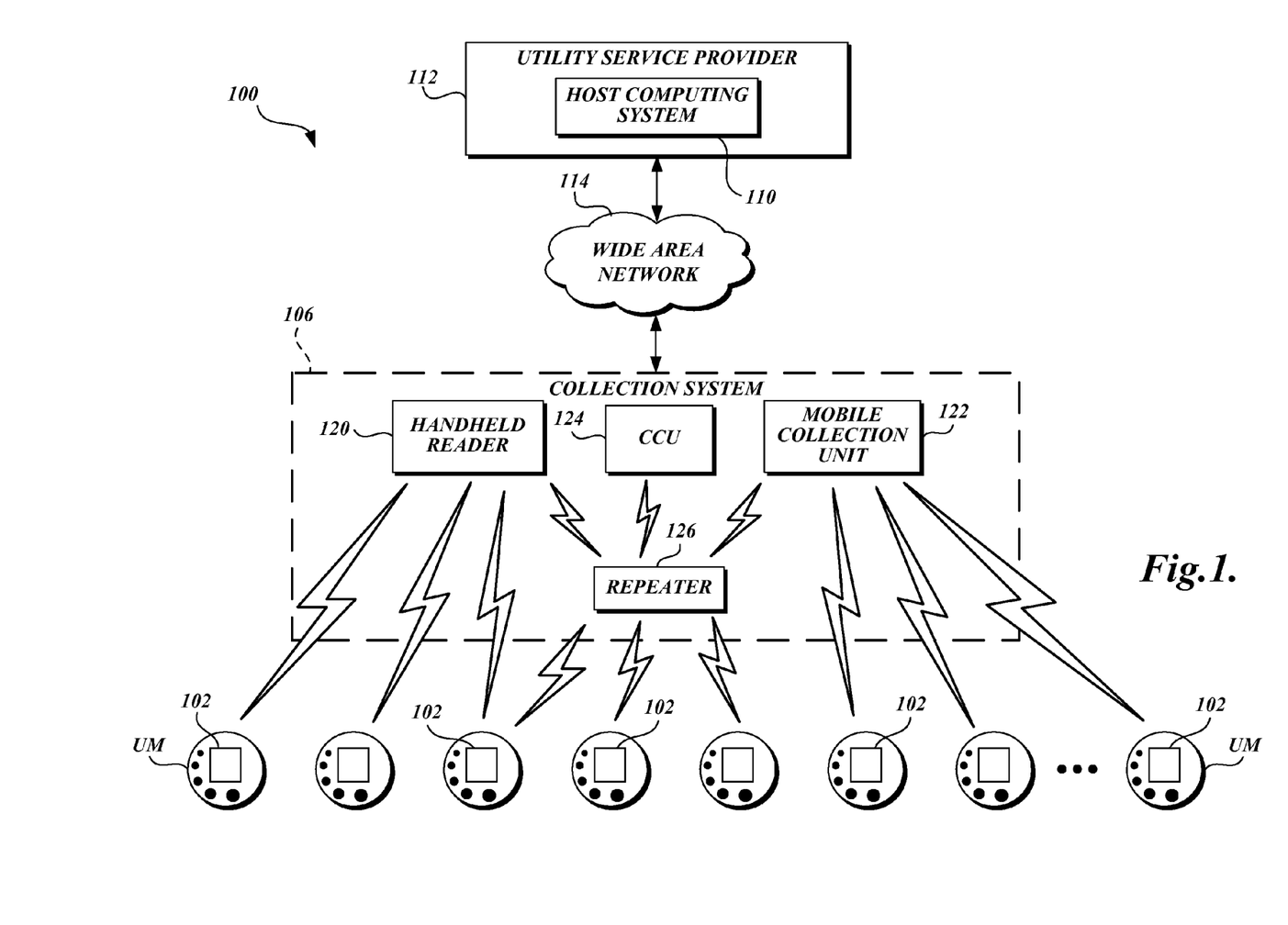
FIG. 1 is a block diagram depicting an illustrative meter reading system formed in accordance with an embodiment of the disclosed subject matter.

Referring now to FIG. 1, the following is intended to provide a general description of one embodiment of a communications system, such as a meter reading system 100, in which aspects of the present disclosure may be implemented.

In one embodiment, the meter reading system 100 may be an automated meter reading (AMR) system that reads and monitors endpoints remotely, typically using a collection system comprised of fixed collection units, mobile collection units, etc.

Generally described, the meter reading system 100 depicted in FIG. 1 includes a plurality of endpoint devices 102, a collection system 106, and a host computing system 110. The endpoint devices 102 are associated with, for example, utility meters UM (e.g., gas meters, water meters, electric meters, etc.), for obtaining data, such as meter data (e.g., consumption data, tampering data, etc.) therefrom. The endpoint devices 102 in the meter reading system 100 may be a wired or wireless communications device capable of performing two-way communications with the collection system 106 utilizing automated meter reading protocols. For example, the endpoint devices 102 are capable of receiving data (e.g., messages, commands, etc.) from the collection system 106 and transmitting meter data on other information to the collection system 106. Depending on the exact configuration and types of devices used, the endpoint devices 102 transmit meter and/or other data either periodically ("bubble-up"), in response to a wake-up signal, or in a combination/hybrid configuration. In each instance, the endpoint devices 102 are configured to exchange data with one or more devices of the collection system 106.

Still referring to FIG. 1, the collection system 106 of the meter reading system 100 collects meter reading data and other data from the plurality of endpoint devices 102, processes the data, and forwards the data to the host computing system 110 of the utility service provider 112. The collection system 106 may employ any number of automated meter reading protocols and devices to communicate with the endpoint devices 102. In the embodiment shown, the collection system 106, for example, may include a handheld meter reader 120 capable of radio-based collection and/or manual entry of meter readings. As illustrated, the collection system 106 may also include a mobile collection unit 122 (e.g., utility vehicle), configured with a radio transmitter/receiver for collecting meter readings within a drive-by coverage area. In addition, the collection system 106, may also include, for example, a fixed network comprised of one or more Cell Control Units 124 ("CCU 124") that collect radio-based meter readings within a particular geographic area. Each of the meter reading devices 120-124 may collect data either directly from the endpoint devices 102, or indirectly via one or more optional repeaters 126. Collectively, the meter reading devices included in the collection system 106 will be referred to hereinafter as a "collector." In this regard, those skilled in the art and others will recognize that other types of collectors than those illustrated in FIG. 1 may be used to implement aspects of the disclosed subject matter. Accordingly, the specific types of devices illustrated should be construed as exemplary as other types of devices may be used without departing from the scope of the claimed subject matter.

In the embodiment depicted in FIG. 1, the collection system 106 is configured to forward meter readings to the host computing system 110 of the utility service provider 112 over a wide area network 114, which may be implemented utilizing TCP/IP Protocols (e.g., Internet), GPRS or other cellular-based protocols, Ethernet, WiFi, Broadband Over Power Line, and combinations thereof, etc. In one aspect, the collection system 106 serves as the bridge for transmitting data between devices that utilize automated meter reading protocols (e.g., the endpoint devices 102) with computers (e.g., the host computing system 110) coupled to the wide area network 114. As mentioned previously collectors are configured to receive meter reading data (e.g., packets) from one or more endpoints 102. The received data is parsed and re-packaged into a structured format suitable for transmission over the wide area network 114 to the host computer system 110. In this regard, meter reading data may be aggregated in a data store maintained at the host computing system 110. Accordingly, the host computing system 110 includes application logic for reading, processing, and managing the collection of meter data.

The discussion provided above with reference to FIG. 1 is intended as a brief, general description of one meter reading system 100 capable of implementing various features of the present disclosure. While the description above is made with reference to particular devices linked together through different interfaces, those skilled in the art will appreciate that the claimed subject matter may be implemented in other contexts. In this regard, the claimed subject matter may be practiced using different types of devices and communication interfaces than those illustrated in FIG. 1.

Figure 2:
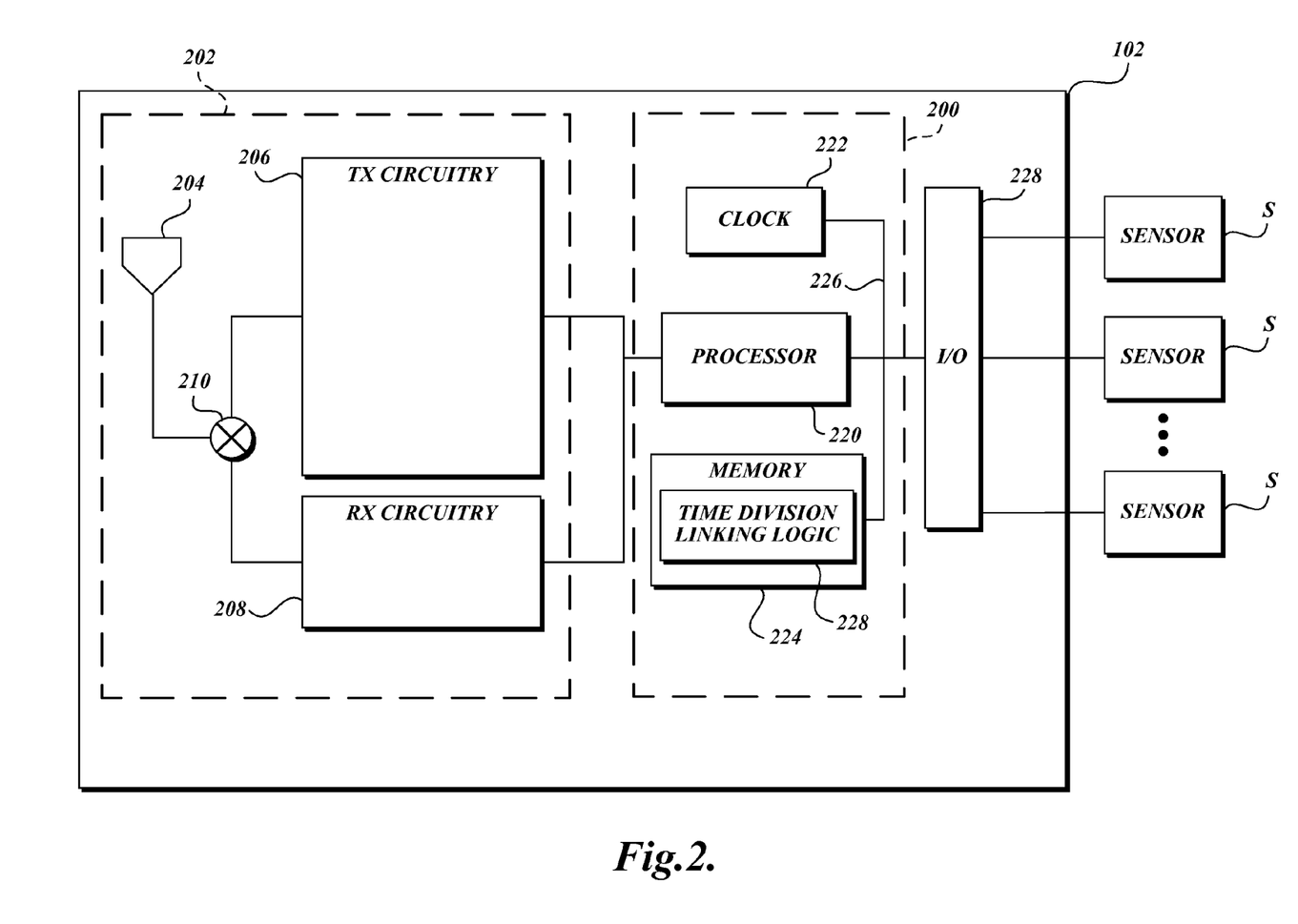
FIG. 2 is a block diagram depicting components of one example of an endpoint device formed in accordance with an embodiment of the disclosed subject matter.

Turning now to FIG. 2, there is shown one example architecture of an endpoint device 102 for use in the meter reading system 100. Each endpoint device 102 continuously gathers and stores meter data from the associated sensors of the utility meters. Upon request or periodically (e.g., every 30 seconds) the endpoint device 102 retrieves the stored data, formats and/or encodes the data according to one or more metering protocols, and transmits this data or other information via radio frequency (RF) communication links. The endpoint devices 102 are also capable of receiving data from a collector, or other RF-based communications devices.

For carrying out the functionality described herein, each endpoint device 102 comprises a main computing device 200 communicatively coupled to a communications device 202. In the example depicted in FIG. 2, the communications device 202 is a radio-based transceiver, transmitter-receiver, or the like, that may include a communications antenna 204, transmit (TX) circuitry 206 and receive (RX) circuitry 208, and an antenna multiplexer 210 that switches between the transmit (TX) circuitry 206 and the receive (RX) circuitry 208 depending on the mode of operation. The communications device may be configured to transmit RF-based communications signals according to any suitable modulation protocols, such as DSSS, FHSS, FM, AM, etc. The transmit circuitry and/or receive circuitry may be implemented as an RF integrated circuit (RFIC) chip, and may comprise various components including, for example, mixers, a voltage controlled oscillator (VCO), a frequency synthesizer, automatic gain control (AGC), passive and/or active filters, such as harmonic filters, dielectric filters, SAW filters, etc, A/D and/or D/A converters, modulators/demodulators, PLLs, upconverters/downconverters, and/or other analog or digital components that process baseband signals, RF signals, or IF band signals, etc.

In one embodiment, the endpoint device 102 transmits data over a preselected set of frequency channels in a predefined frequency band ("operational frequency band") using frequency hopping spread spectrum (FHSS) techniques. For example, in one embodiment, the endpoint device 102 may operate over a preselected set of 80 channels approximately 200 KHz in width. One example of such a frequency band is the 902-918 MHz portion of the ISM frequency band, although other portions of the ISM or other radio frequency bands may be used. The operational frequency band may be contiguous (e.g., 902-918 MHZ) or non-contiguous (e.g., 902-908 and 916-924 MHz). In this embodiment, the endpoint device 102 may frequency hop between channels in the entire operational frequency band or may frequency hop between a subset of channels (e.g., fifty (50) channels) in the operational frequency band. In any event, standard meter readings containing a default set of data may be transmitted as a frequency-hopping spread-spectrum (FHSS) signal at a frequency and time selected in accordance with a frequency hopping table. For example, in one embodiment, using a frequency hopping table, the endpoint device 102 will periodically transmit a FHSS signal having a standard meter reading using one of the programmed subset of fifty (50) frequency channels.

As briefly discussed above, the communication of RF-based communications signals by the endpoint devices 102 is carried out under control of the main computing device 200. In the example depicted in FIG. 2, the main computing device 200 may include a processor 220, a timing clock 222, and a memory 224, connected by a communication bus 226. As further depicted in FIG. 2, the main computing device 200 may also include an I/O interface 228 for interfacing with, for example, one or more sensors S associated with a utility meter. The one or more sensors S may be any known sensor for obtaining consumption data, tampering data, etc. The data obtained from the sensors S is processed by the processor 220 and then stored in the memory 224.

The memory 224 depicted in FIG. 2 is one example of computer-readable media suited to store data and program modules for implementing aspects of the claimed subject matter. As used herein, the term "computer-readable media" includes volatile and non-volatile and removable and non-removable memory implemented in any method or technology capable of storing information, such as computer-readable instructions, data structures, program modules, or other data. In this regard, the memory 224 depicted in FIG. 2 is one example of computer-readable media but other types of computer-readable media may be used.

Those skilled in the art and others will recognize that the processor 220 serves as the computational center of the endpoint device by supporting the execution of instructions that are available from the memory 224. Accordingly, the processor 220 executes instructions for managing the overall system timing and supervision of the endpoint device 102 including accumulating and storing sensor data, providing data to be transmitted, as well as selecting the time and frequency channel the data will be transmitted/received. In this regard, instructions executed by the processor 220 effectuate the formatting or encoding of the meter data and other data in any standard format or protocol. It will be appreciated that the endpoint devices 102 may support and transmit any number of different packet formats in reporting metering data and otherwise communicating with remote devices.

As further illustrated in FIG. 2, the memory 224 also includes time division linking logic 228 having instructions suitable for being executed by the processor 220 to implement aspects of the present disclosure. In one embodiment, the endpoint device 102 is configured to accept and execute instructions based on received commands. For example, in instances when an interference source is limiting communications over one or more channels, a command may be received to re-program the frequency hopping table in which standard meter readings are transmitted. By way of another example, commands to provide intervals of data not included with a standard meter reading may be received. Once the requested data has been accessed from the memory 224, instructions executed by the processor 220 satisfy the command by generating and transmitting a response that includes the requested data.

In one embodiment, the time division linking logic 228 facilitates two-way communications between the endpoint 102 and remote devices (e.g., collectors). For example, after transmitting the response that includes the requested data to the collector, logic 228 executed by the endpoint may then activate the receiver circuitry 208 to listen for new commands after a predetermined period of time has elapsed from transmitting the response. The logic 228 may continue activating the receiver circuitry in this manner if the endpoint continues to receive commands from the collector. As a result, a collector may exchange one or more additional commands without having to reestablish communications at a different time or interval.

In another example, in some instances when a collector anticipates exchanging a sequence of messages, a linked command may be received by the endpoint 102. In turn, the endpoint 102 executes the logic of the linked command and returns an appropriate response. To facilitate additional communications, as a result of the command being a "linked command" the endpoint 102 will then activate the receiver circuitry 208 after a predetermined period of time from transmitting the initial message has elapsed. As a result, a collector may exchange one or more additional commands without having to reestablish communications at a different time or interval. One embodiment of a routine 500 implemented by the time division linking logic 228 will be described in detail below with reference to FIG. 5.

Now with reference to FIG. 3, one example component architecture for a collector 300 will be described. As mentioned previously with reference to FIG. 1, the collector 300 may be a handheld meter reader, a mobile collection unit (e.g., utility vehicle), a CCU, etc. Generally described, the collector 300 includes a processor 302, a memory 304, and a clock 306 interconnected via one or more buses 308. In addition, the collector 300 includes a network interface 310 comprising components for communicating with other devices over the wide area network 114 (FIG. 1), utilizing any appropriate protocol, such as TCP/IP Protocols (e.g., Internet), GPRS or other cellular-based protocols, Ethernet, WiFi, Broadband Over Power Line, and combinations thereof, etc. As further depicted in FIG. 3, the collector 300 includes a radio-based communication device 312 for transmitting/receiving wireless communications with other radio-based devices (e.g., the endpoint devices 102).

Figure 3:
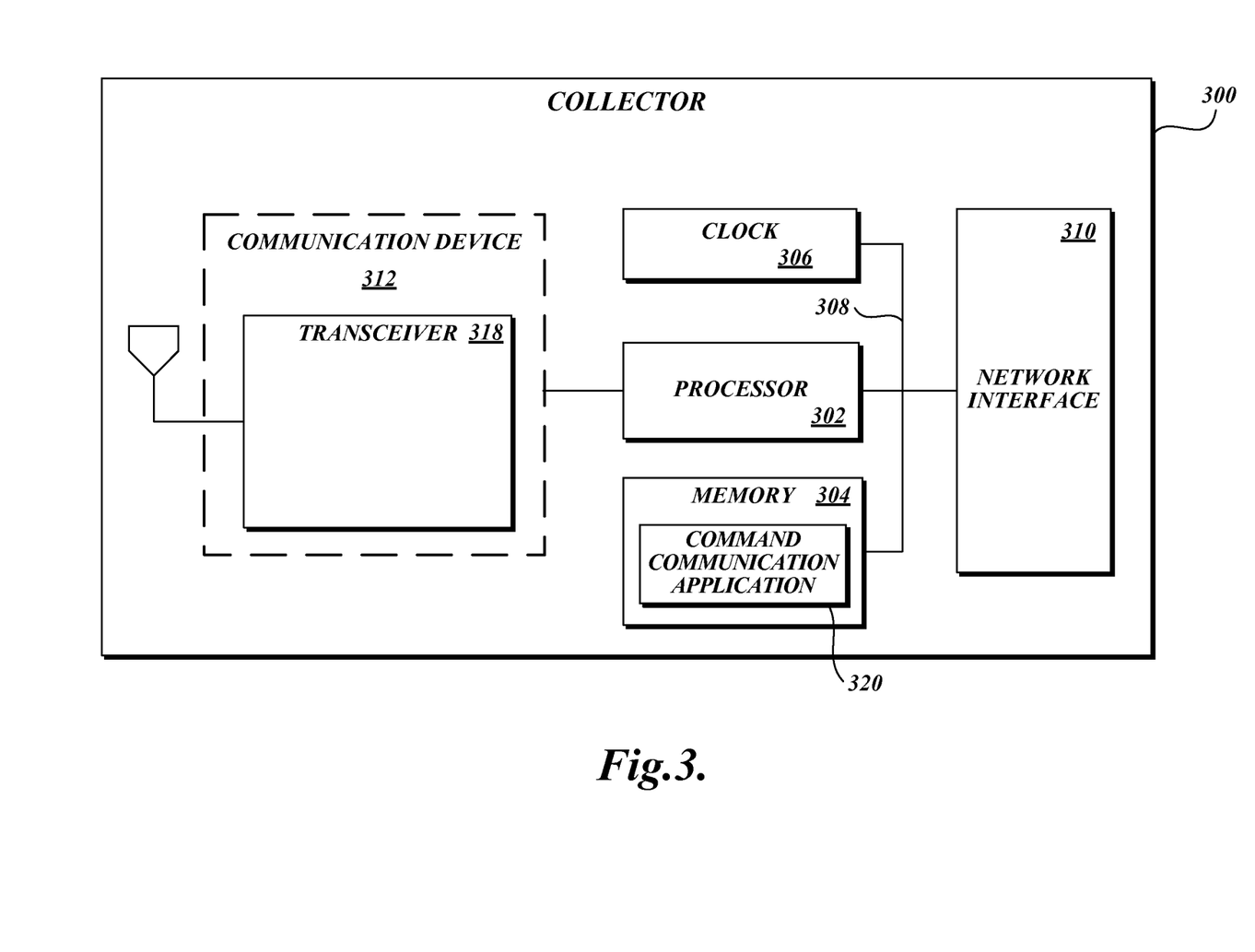
FIG. 3 is a block diagram depicting components of one example of a collector formed in accordance with an embodiment of the disclosed subject matter.

In the embodiment shown in FIG. 3, the communication device 312 includes at least one transceiver, transmitter-receiver, or the like, generally designated 318, of half-duplex (transmit or receive but not both simultaneously) or full-duplex design (transmit and receive simultaneously) that is capable of identifying, locating, and tracking FHSS signals transmitted by the endpoint devices 102. In one embodiment, the radio-based communications device 312 has the ability to measure the signal strength level and/or noise/interference level of all channels across the endpoints' operating frequency band. Accordingly, the collector 300 can generate and store a "snapshot" of the measurement of signal strength and/or noise/interference levels in the frequency channels. In instances when meter readings are transmitted from one or more endpoint device 102 at regular intervals (e.g., bubble up), the communication device 312 examines the entire portion of the operational frequency band employed by the endpoint devices 102 to identify a signal suggestive of meter data. In addition or alternatively, the collector 300 can send a "wake-up" message in order to establish communication with the endpoint device 102.

In the embodiment depicted in FIG. 3, the memory 304 includes a command communication application 320 having instructions suitable for being executed by the processor 302 to implement aspects of the present disclosure. As mentioned previously, the collector 300 is configured to receive meter reading data (e.g., packets) from different types of endpoints. Some endpoints in a metering system may only be capable of performing simplex communications. Other endpoints provide enhanced functionality that may be accessed by the collector 300 through the transmission and execution of one or more commands. In one aspect, the command communication application 320 analyzes incoming messages to determine whether a command will be issued to a particular endpoint. In instances when the endpoint that generated a message is not configured to accept commands or a command does not need to be issued, two-way communications may not be exchanged with the endpoint. On the other hand, the command communication application 320 could issue and transmit a command to an appropriately configured endpoint. In this instance, the collector 300 encodes and transmits a message containing the command at a time and frequency known to the endpoint. In some instances when the collector 300 anticipates exchanging a sequence of messages, the command being issued may be designated as a "linked" command. Upon executing and responding to a "linked" command or by default, time division linking logic 228 on the endpoint 102 activates a receiver to listen for additional messages transmitted by the collector 300. In turn, the collector 300 and endpoint 102 may repeatedly exchange communications until all of the desired functionality is implemented.

Figure 4A:
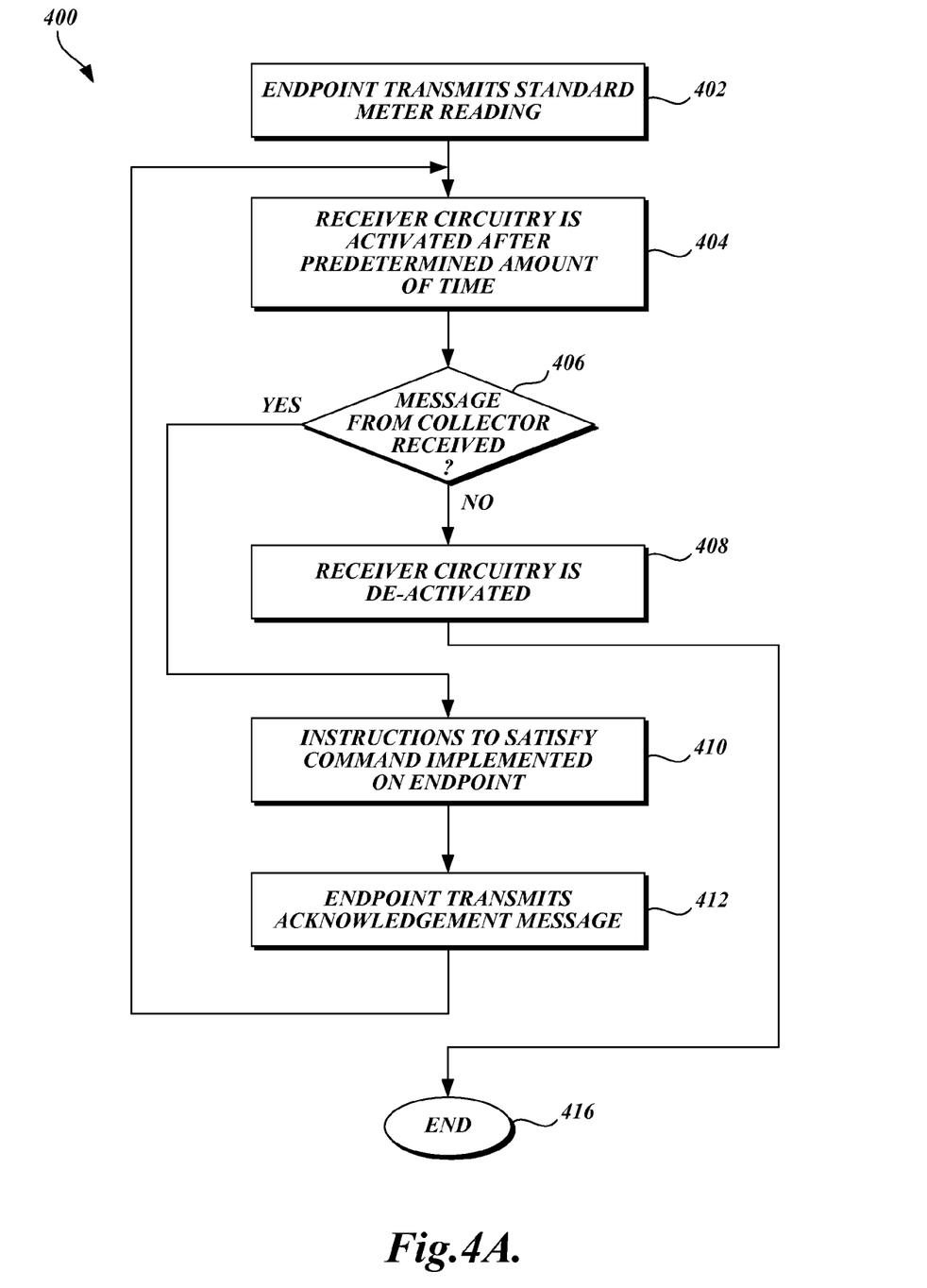
FIG. 4A is a flow diagram of one example of an endpoint linking routine in accordance with an embodiment of the disclosed subject matter
Figure 4B:
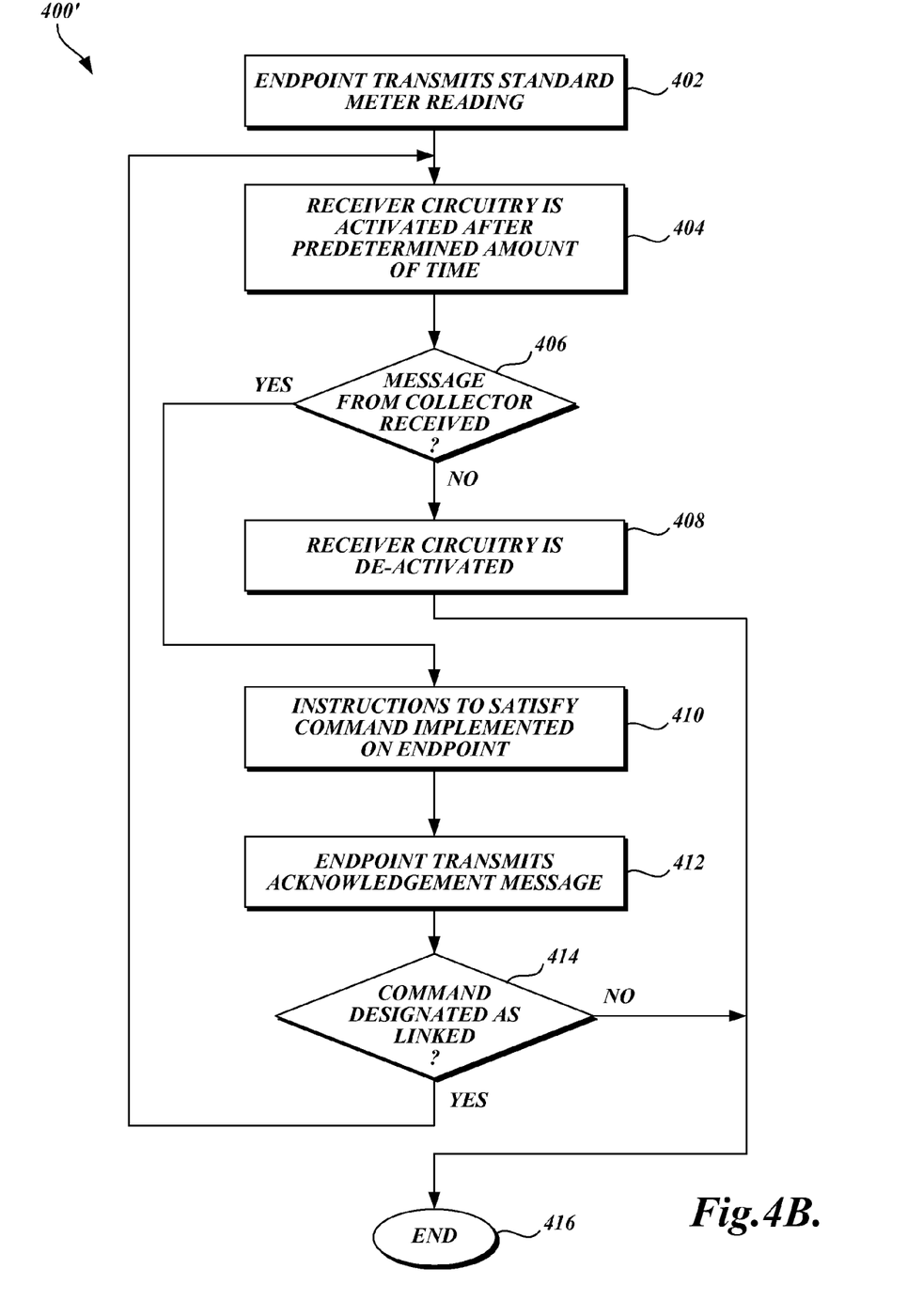
FIG. 4B is a flow diagram of another example of an endpoint linking routine in accordance with an embodiment of the disclosed subject matter.
Figure 5:
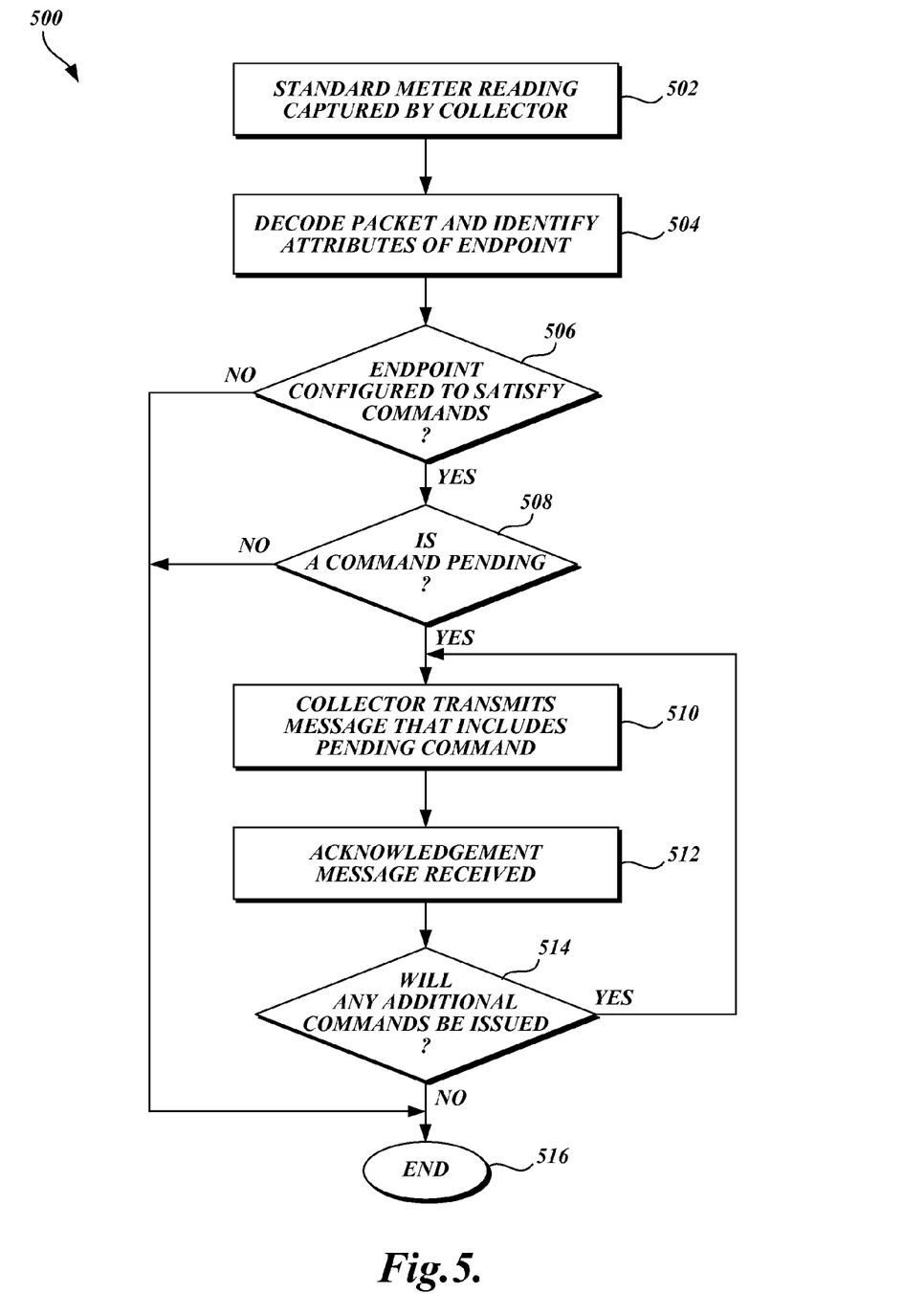
FIG. 5 is a flow diagram of one example of a collector linking routine in accordance with an embodiment of the disclosed subject matter.

Now with reference to FIG. 4-5, exemplary routines 400 and 500 suitable for being implemented in the metering system 100 depicted in FIG. 1, are described. As mentioned previously, some endpoints may be configured to accept and respond to received commands. However, to minimize the consumption of power, endpoints are typically configured to only supply power to a receiver and receive messages as needed. The way in which network devices transmit and listen for communications may be defined in automated meter reading protocols. In one aspect, the present disclosure extends existing automated meter reading protocols to improve and better facilitate communications in the metering system 100. As described in further detail below, existing automated meter reading protocols are extended in a way that enables time-divided communications between a collector 300 and one or more endpoints 102. With reference to FIGS. 4A and 4B, examples of an endpoint linking routine 400 that allow an endpoint to establish and participate in time-divided communications is described. Then, an example collector linking routine 500 is provided with reference to FIG. 5 that describes the collection logic for performing time-divided communications.

As illustrated in FIG. 4A, the endpoint linking routine 400 begins at block 402 where a standard meter reading having a default set of data is encoded and transmitted by an endpoint. As mentioned previously, the endpoint may transmit the standard meter reading periodically ("bubble-up"), in response to "wake up" polling signal, etc. In one embodiment, the standard meter reading is transmitted as a frequency-hopping spread-spectrum (FHSS) signal. Accordingly, the frequency and time for transmitting the standard meter reading, at block 402, may be selected in accordance with a frequency hopping table, as described above.

In one embodiment, meter readings are encoded as "packetized" data by an endpoint for transmission over the network. It will be appreciated that endpoints may utilize any number of different packet formats when reporting metering data or otherwise communicating with remote devices. To facilitate communications, a packet that encapsulates a standard meter reading, may contain data items that allows a remote device (e.g., collector) to identify the attributes and capabilities of the endpoint. With this information, the collector is able to transmit a message and cause a command to be implemented on the endpoint, as described in further detail below.

At block 404 of the endpoint linking routine 400, the endpoint waits a predetermined amount of time (e.g., 1 second) before activating receiver circuitry to listen for a message on the designated channel. Although not required, two-way communications between an endpoint and collector may occur over a common communication medium. For example, the channel used to transmit the standard meter reading, at block 402, may be used by the collector to transmit a message back to the endpoint. To synchronize data exchange and avoid collisions, automated meter reading protocols provided by the disclosed subject matter define the timing of when transmissions may be exchanged. In particular, an endpoint capable of receiving a two-way communications waits a predetermined amount of time (e.g., 1 second), after transmitting a standard meter reading (at block 402). Then, the receiver circuitry of the endpoint is activated (at block 404) to listen for a return message. In one embodiment, the endpoint listens for the return message on the same channel that was used to transmit the standard meter reading. In alternative embodiments, different incoming and outgoing channels and/or multiple channels that each are known to both the collector and endpoint could be used to exchange messages.

At decision block 406, a determination is made regarding whether a message having a command issued by a collector was received at the endpoint. Upon receiving a standard meter reading, the time and channel in which the relevant endpoint can receive a message is known to the collector. As described in further detail below, the collector is able to selectively choose whether to transmit a message at the designated time and frequency. After the receiver circuitry of the endpoint is activated (at block 404), the endpoint listens another predetermined amount of time (e.g., 1 second). If a return message is received, the result of the test performed at block 406 is "yes" and the endpoint linking routine 400 proceeds to block 410, described in further detail below. Conversely, in instances when a collector does not transmit a message to the endpoint, the result of the test performed at block 406 is "no" and the endpoint linking routine 400 proceeds to block 408. At block 408, the receiver circuitry of the endpoint is deactivated and the endpoint discontinues listening for a message on the channel. However, the collector may re-establish communications with the endpoint at the next interval when a standard meter reading message is received or by transmitting a "wake-up" message, as described above. Then, once the receiver circuitry of the endpoint is deactivated, the endpoint linking routine 400 proceeds to block 416, where it terminates.

As further illustrated in FIG. 4A, the endpoint implements instructions to satisfy a received command, at block 410. If block 410 is reached, the collector transmitted a message having a command that will be satisfied by the endpoint. By way of example only, a received command may re-program the channels on which the endpoint transmits meter readings, request particular types and/or intervals of consumption data, modify network configuration information and/or the packet format in which data is encapsulated for network transmission, etc. However, the types of commands that may be satisfied at block 410 are outside of the scope of the present disclosure and will not be described here. Once the instructions for satisfying the command have been executed, the endpoint transmits an acknowledgment message on the designated channel, at block 412. In this regard, the acknowledgment message, transmitted at block 412, indicates that the endpoint received and satisfied the command. In addition, the message may include metering data, usage statistics, configuration information, or any other data requested by the collector.

Once the acknowledgement message is transmitted at block 412, the routine returns to block 404, where the endpoint then waits for a predetermined amount of time (e.g., 1 second) before activating the receiver circuitry to listen for another message from the collector. In turn, blocks 404-412 of the endpoint linking routine 400 may repeat and continue to satisfy any number of additional commands sent by the collector. As stated above, the receiver circuitry may listen on the same channel as the previous communication for receiving the next command, or may "hop" to another channel based on its frequency hopping table known by the collector for receiving the next command. It will be appreciated that in some implementations within the ISM frequency band, federal regulations may limit the total number of additional commands if employing the same channel. However, such limitations may not apply when "hopping" channels.

Referring now to FIG. 4B, there is shown another example of a routine 400'. In routine 400', instead of returning to bock 404, the routine 400' proceeds to block 414. At decision block 414 of the endpoint linking routine 400', a determination is made regarding whether the current command is a "linked" command. In this example, a command issued by the collector may be designated as a "linked command" in some instances where the collector anticipates issuing a sequence of commands. In this regard, a data item may be provided by the collector to indicate that a message contains a command that is potentially "linked" to a subsequent command. Those skilled in the art and others will recognize that dependencies may exist when requesting data and causing instructions to be executed on an endpoint. For example, a command issued by a collector may cause particular intervals of consumption data to be returned by an endpoint. In some instances, the collector uses the returned data as the basis for formulating one or more additional commands. In this instance, the collector may designate that the command being issued is a "linked" command so that communications do not have to be re-established with the collector on a different channel or meter reading interval to issue any additional commands.

In instances when the result of the test performed at block 414 is "yes," the endpoint linking routine 400 proceeds back to block 404. As described previously, the endpoint then waits (at block 404) for a predetermined amount of time (e.g., 1 second) before activating receiver circuitry to listen for another message. In turn, blocks 404-414 of the endpoint linking routine 400 may repeat and continue to satisfy an indefinite number of additional "linked" commands as described above with regard to FIG. 4A. If the current command is not a linked command, and the result of the test performed at block 414 is "no," the endpoint linking routine 400 proceeds to block 416, where it terminates.

It should be well understood that the routine 400 described above with reference to FIG. 4 does not show all of the functions performed within the host computing system 100 depicted in FIG. 1. Those skilled in the art and others will recognize that some functions and/or exchanges of data described above may be performed in a different order, omitted/added, performed by other devices, etc., or otherwise varied without departing from the scope of the claimed subject matter. In this regard, the routine 400 or certain portions thereof may not be performed in the same way by each endpoint in the metering system 100. For example, one or more endpoints in the metering system 100, may not be configured to accept and/or execute "linked" commands. Instead, the endpoint may implement a portion of the endpoint linking routine 400 to listen and satisfy a single command issued by the collector after transmitting the standard meter readings. As described in further detail below, the collector is configured to identify these types of variations in the configuration of different endpoints and exchange communications accordingly.

Now, with reference to FIG. 5, a collector linking routine 500 for performing time-divided communications on a collector will be described. As illustrated in FIG. 5, the collector linking routine 500 begins at block 502 where a standard meter reading containing a default set of data is captured. As mentioned previously, the collector can generate and store a "snapshot" of the operational frequency band employed by the endpoint devices 102. In one embodiment, the collector examines the operational frequency band employed by the endpoint devices 102 to identify and capture a signal containing a standard meter reading, at block 502.

At block 504 of the endpoint linking routine 500, processing is performed to decode and identify the capabilities/attributes of the endpoint that generated the message received at block 502. As understood in the art, packets that have encoded meter reading data typically maintain fields as defined in a metering protocol. By way of example only, these fields may include a preamble, a data link layer data application layer data, etc. In one embodiment, data in particular fields in the packet decoded at block 504 may be used to identify the capabilities/attributes of the appropriate endpoint.

At decision block 506 of the endpoint linking routine 500, a determination is made regarding whether the endpoint is configured to satisfy a received command. In one embodiment, a data item in the preamble of the received packet indicates whether the packet originated from legacy device only capable of performing simplex communications. In this instance, the result of the test performed at block 506 is "no" and the endpoint linking routine 500 proceeds to block 516, where it terminates. Conversely, if the data item indicates that, for example, the endpoint is configured to perform two-way communication to satisfy received commands, the collector linking routine 500 proceeds to block 508.

At decision block 508, the endpoint linking routine 500 determines whether a pending command exists for the relevant endpoint. As mentioned previously, data from a plurality of collectors may be aggregated in a data store maintained at the host computing system. This data may be analyzed at the host computer to optimize network configuration, detect problems/malfunctions in meters, and the like. Based on this or other types of processing, one or more commands may be generated by the host computing system for distribution to one or more endpoints via the collector. At block 508, the collector will perform a lookup to determine whether one or more commands for the relevant endpoint are pending. If a command is not pending and the result of the test performed at block 508 is "no," the collector linking routine 500 proceeds to block 516, where it terminates. Conversely, if the result of the test performed at block 508 is "yes," then the collector linking routine 500 proceeds to block 510. In one embodiment, if multiple commands are in the queue to be transmitted to a particular endpoint, this set of commands may be "linked" or somehow grouped together so that the collector knows to continue transmitting, one at a time, the commands in the set of commands to the endpoint at the appropriate time slot and on the appropriate channel.

At block 510, a message that includes the pending command is transmitted by the collector. As mentioned previously, AMR protocols extended by the disclosed subject matter define the manner in which messages are exchanged with an endpoint. Data formulated in accordance with these AMR protocols is included in the message (e.g., packet) used by an endpoint to report a standard meter reading. Upon decoding the standard meter reading, the collector is able to identify the time and channel on which the relevant endpoint is listening for a message from the collector. In transmitting at block 510, in one embodiment described above with regard to FIG. 4B, the collector may provide a data item to designate the command as being a "linked" command. Once formulated, a message containing command logic is then transmitted at the designated time and frequency. In the exemplary embodiment described above with reference to FIGS. 4A and 4B, the collector transmits the message after waiting a predetermined amount of time (e.g., 1 second) from receipt of the standard meter reading, at block 502.

Once the current command has been implemented, the collector receives an acknowledgement message transmitted by the endpoint, at block 512. As described previously with reference to FIGS. 4A and 4B, the acknowledgement message generated by the endpoint may include data that is used by the collector to formulate one or more additional commands. Alternatively, as described briefly above with regard to block 508, the collector may have one or more commands designated as "linked" in the queue to be transmitted to the endpoint. Accordingly, at decision block 514, a determination is made regarding whether any additional commands will be issued. If the result of the test performed at block 514 is "yes," then the collector linking routine 500 proceeds back to block 510, and blocks 510-514 repeat. On these subsequent iterations of the collector linking routine 500, command logic may be formulated dynamically at the collector. In addition or alternatively, data provided by the endpoint may be forwarded to the host computing system 110 and used to formulate the command logic that is ultimately transmitted back to the endpoint and implemented. Once the desired functionality has been implemented and additional commands will not be issued, the result of the test performed at block 514 is "no" and the collector linking routine 500 proceeds to block 516, where it terminates.

While embodiments of the claimed subject matter have been illustrated and described, it will be appreciated that various changes can be made therein without departing from the spirit and scope of the present disclosure.

The embodiments in which an exclusive property or privilege is claimed are defined as follows:

1. An endpoint operative to perform a method for exchanging time-divided communications with a remote device, the method comprising:
    within a predefined frequency band, transmitting a standard meter reading having data defined in accordance with a metering protocol;
    after a first period of time defined in the metering protocol has elapsed, activating a receiver to listen for a message on a designated channel that is known by the remote device;
    receiving a message from the remote device having a command to execute instructions, wherein the message includes a data item that indicates whether the command is designated as a linked command;
    transmitting a response message responsive to the command; and
    when the command is designated as a linked command, activating the receiver after a second period of time defined in the metering protocol has elapsed.

2. The endpoint of claim 1, wherein the designated channel is identical to a channel utilized for transmitting the standard meter reading.

3. The endpoint of claim 1, wherein the designated channel is different than a channel utilized for transmitting the standard meter reading.

4. A system for performing time-divided communications over a shared communication medium, the system comprising:
    a collector capable of monitoring a set of transmission channels for data indicative of a standard meter reading, receiving a standard meter reading over a channel that is being monitored, determining whether to issue a command to an endpoint that generated the standard meter reading; and
    an endpoint for transmitting a standard meter reading over the channel, activating a receiver to listen for a message transmitted over a designated channel once a first pre-determined amount of time from the transmission of the standard meter reading has elapsed, and receiving a message on the designated channel transmitted by the collector;
    wherein the collector is configured to transmit a command to execute instructions to the endpoint after the first pre-determined amount of time from the transmission of the standard meter reading has elapsed and before receiving any further message from the endpoint, the command including a data item indicating whether the command is designated as linked; and
    wherein the endpoint is to transmit a response message responsive to the command and, when the command is designated as linked, to activate the receiver to listen for a second message after a second pre-determined amount of time from the transmission of the response message.

5. The system of claim 4, wherein the designated channel is identical to the channel utilized for transmitting the standard meter reading.

6. The system of claim 4, wherein the designated channel is different than the channel utilized for transmitting the standard meter reading.

7. The endpoint of claim 1, wherein the command instructs the endpoint to re-program a frequency hopping table that provides frequencies at which meter reading transmissions are transmitted.

8. The endpoint of claim 1, wherein the command instructs the endpoint to modify a packet format in which data is encapsulated for network transmission.

9. The endpoint of claim 1, wherein the standard meter reading is encapsulated in a packet, the packet containing one or more data elements that allow the remote device to identify one or more capabilities of the endpoint.

10. The endpoint of claim 9, wherein the command to execute instructions is created by the remote device based on the one or more capabilities of the endpoint.

11. The endpoint of claim 9, wherein the one or more data elements are included in a preamble portion of the packet and indicate whether the endpoint is only capable of performing simplex communications.

12. The endpoint of claim 1, wherein the first period of time defined in the metering protocol is at least one second in length.

13. The endpoint of claim 1, wherein the second period of time is measured with respect to the transmission of the standard meter reading.

14. The endpoint of claim 1, wherein the endpoint does not activate the receiver after transmitting the response message when the command is not designated as linked.

15. The system of claim 4, wherein the collector is to designate the command as linked when the collector anticipates exchanging a sequence of messages with the endpoint.

16. The system of claim 15, wherein the standard meter reading is encapsulated in a packet, the packet containing one or more data elements that allow the collector to identify one or more capabilities of the endpoint, and wherein the collector is to determine whether it anticipates exchanging a sequence of messages with the endpoint based on the one or more capabilities.

17. A method of operating a collector to exchange time-divided communications with an endpoint, the method comprising:

receiving a standard meter reading from the endpoint;

determining how many pending commands exist for the endpoint; and after a pre-determined period of time from the transmission of the standard meter reading by the endpoint, sending a message to the endpoint that includes a first command, the message including a data item that indicates whether the first command is designated as linked;

wherein the first command is designated as linked when the collector determines that a plurality of pending commands exist for the endpoint.

18. The method of claim 17, wherein the first command is not designated as linked when the collector determines that a single pending command exists for the endpoint, the first command being the single pending command.

19. The method of claim 17, wherein determining how many pending commands exist for the endpoint comprises performing a lookup with respect to a data store maintained at a host computing system.

20. The method of claim 17, further comprising:

prior to determining how many pending commands exist for the endpoint, determining whether the endpoint is configured to satisfy commands based on data included in a packet that encapsulates the standard meter reading; and terminating the method prior to determining how many pending commands exist for the endpoint when the endpoint is not configured to satisfy commands.

\* \* \* \* \*